May 9, 1939. M. T. WESTON 2,158,047
VARIABLE SPEED TRANSMISSION
Filed April 9, 1937 4 Sheets-Sheet 1

INVENTOR
Milton T. Weston

May 9, 1939.  M. T. WESTON  2,158,047
VARIABLE SPEED TRANSMISSION
Filed April 9, 1937  4 Sheets-Sheet 2

INVENTOR
Milton T. Weston

May 9, 1939.    M. T. WESTON    2,158,047
VARIABLE SPEED TRANSMISSION
Filed April 9, 1937    4 Sheets-Sheet 3

INVENTOR
Milton T. Weston

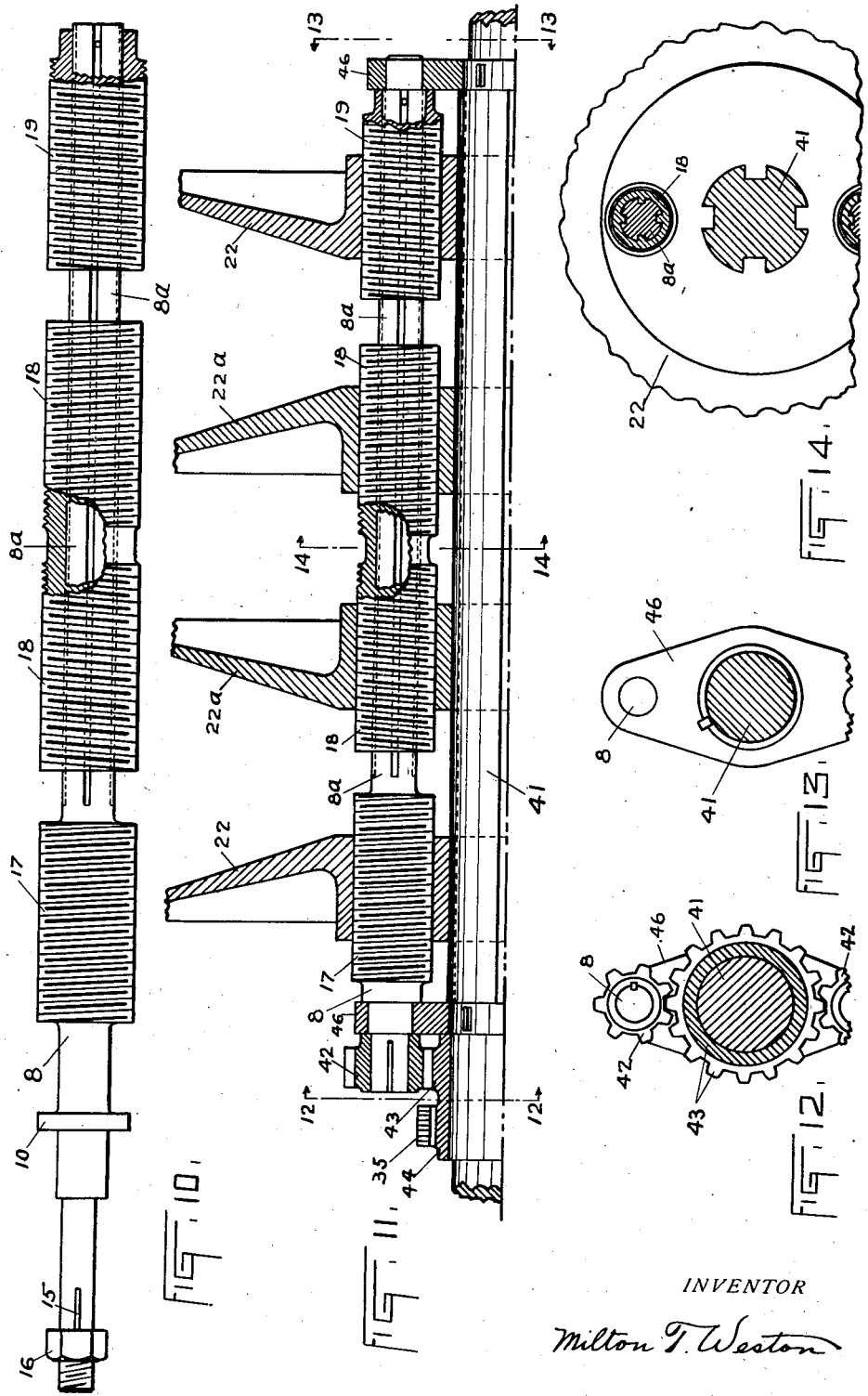

Patented May 9, 1939

2,158,047

UNITED STATES PATENT OFFICE 2,158,047

VARIABLE SPEED TRANSMISSION

Milton T. Weston, Red Bank, N. J.

Application April 9, 1937, Serial No. 135,917

9 Claims. (Cl. 74—230.17)

My invention relates to improvements in variable speed transmissions and has for its principal object to provide a mechanism of this character wherein the driving and driven elements comprise plain tapered discs adapted to co-operate with special metallic driving chains of the character covered by my Patent No. 1,997,284 and illustrated in Fig. 2, and by my co-pending application No. 133,553, filed March 29, 1937 and illustrated in Fig. 1. Both of these metallic chains operate on an infinite number of pitch diameters and have a gripping or jamming action which is inherent in their design and which positively prevents them from slipping on the hardened and ground surfaces of the tapered driving and driven discs. The use of these metallic chains makes it possible to construct a much more compact design and also permits the entire mechanism to run in an oil bath for perfect lubrication.

An important feature of my invention is the adaptation and use of my mechanical control device shown in my co-pending application, Serial No. 81,597, allowed March 11, 1937. This control mechanism avoids the use of the thrust bearings, levers etc. now universally used in this type of transmission.

Another object of importance is the ability to compound the driving and driven elements in order to incorporate, in one housing, additional horse power in proportion to the number of units compounded. This compounding is made possible in applicant's device by the provision of automatically adjustable means which allow each driving chain to adjust its own operating pitch circle in order that it may assume exactly its share of the driving stress and consequently deliver exactly its own proportionate share of the total horse power. This self-adjusting feature, therefore, compensates for any inequalities of wear in service and for any inaccuracies in manufacture.

Other objects and advantages will appear in the following specification and are shown in the accompanying drawings in which similar reference numerals refer to like parts in all of the views.

Fig. 1 is a horizontal sectional view of the compounded type of my invention. One set of control apparatus is shown in plan and the other set in horizontal cross section on a line 1—1 of Figs. 3 and 4. The control shafts in this view are concentric with the main shafts.

Fig. 10 is a detail view of one of the concentric control shafts shown in Fig. 1, with threaded sleeve in place.

Figure 1:
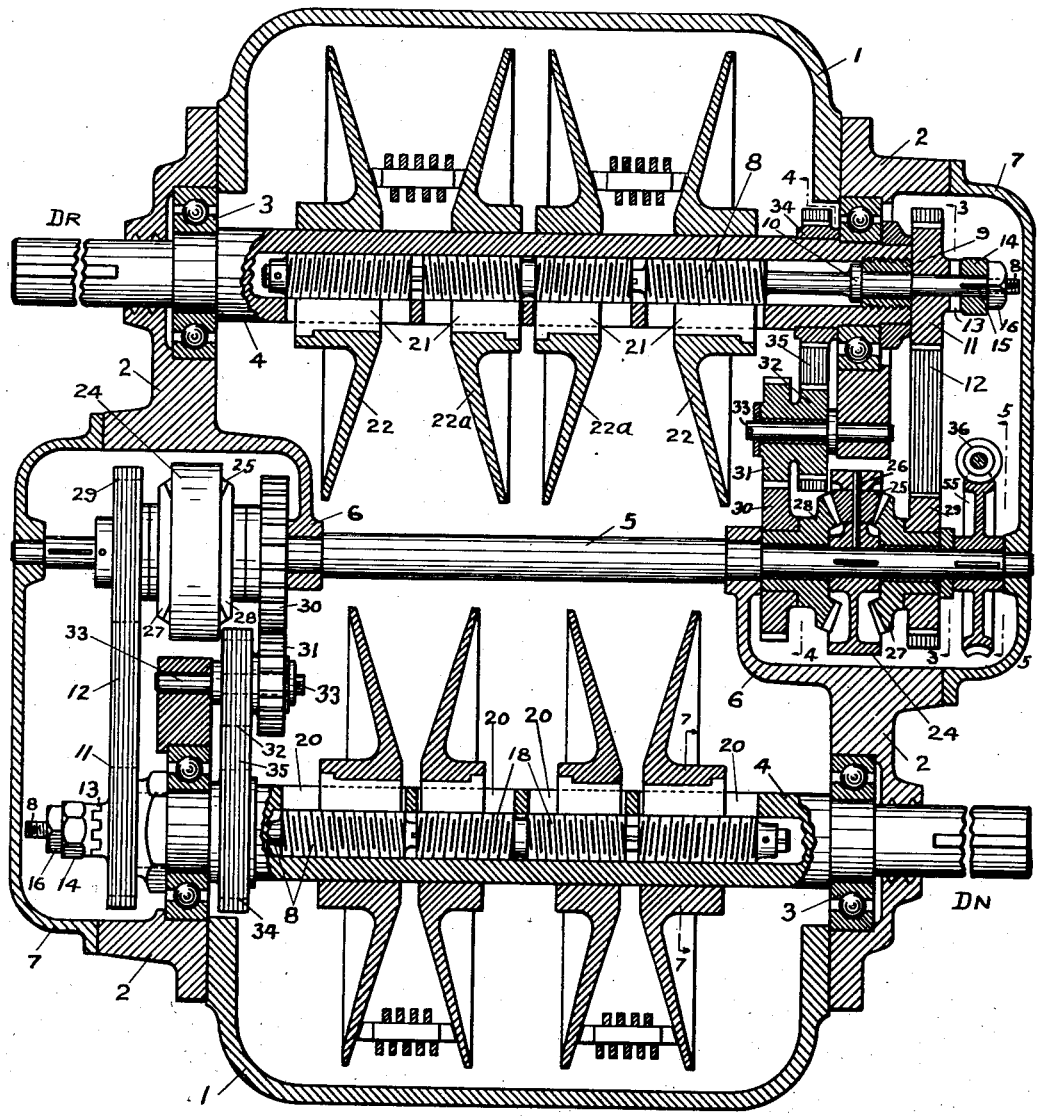
Figure 2:
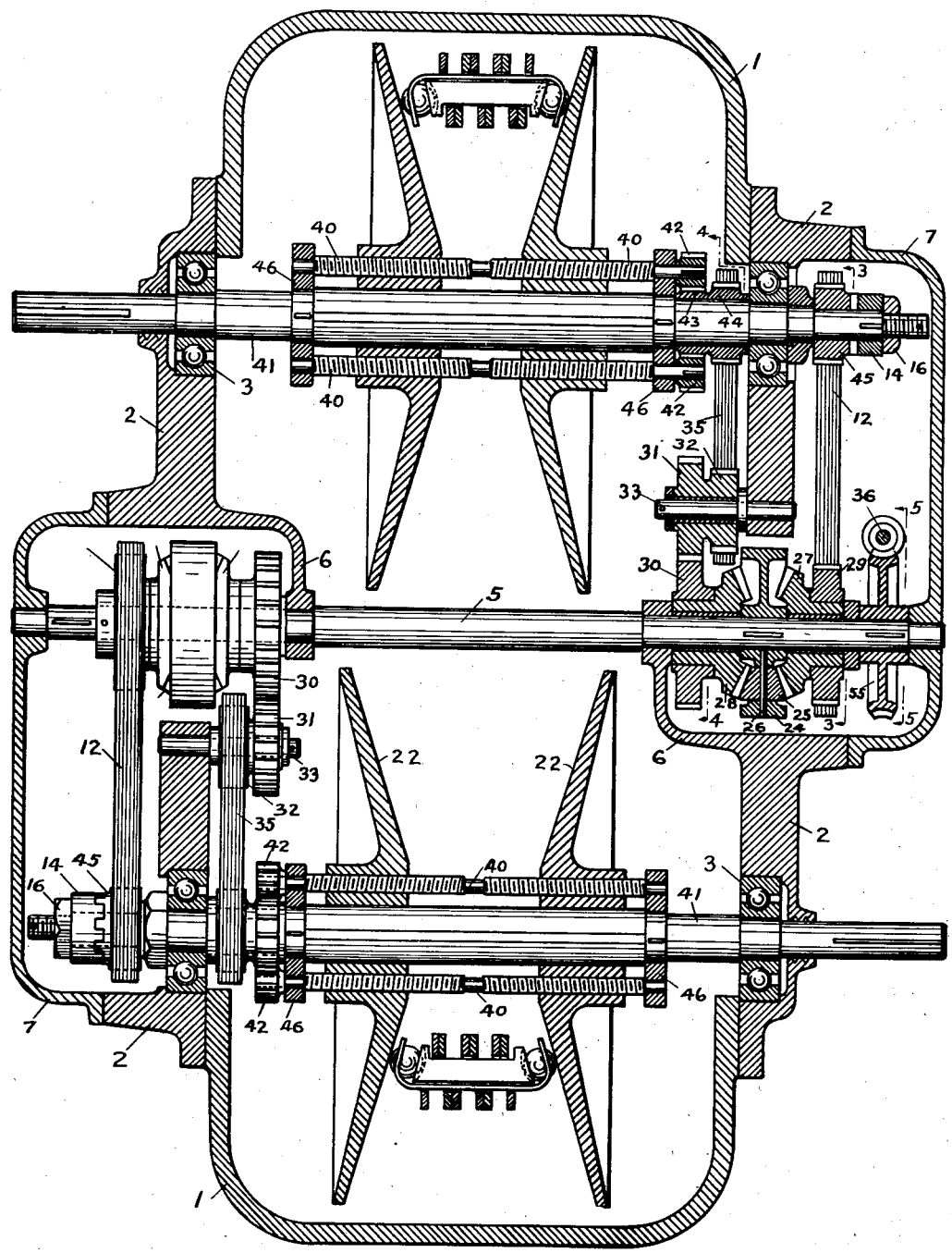
Fig. 2 is a horizontal sectional view of the simple type of my invention similar to the view in Fig. 1 and shows the control shafts exterior to the main shafts.
Figure 3:
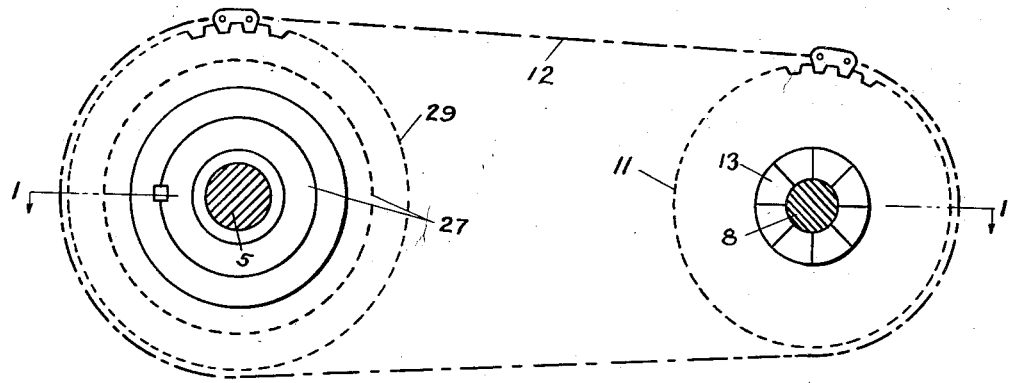
Fig. 3 is a side elevation of the chain drive in one of the sets of control gearing and is taken on a line 3—3 in Figs. 1 and 2.
Figure 4:
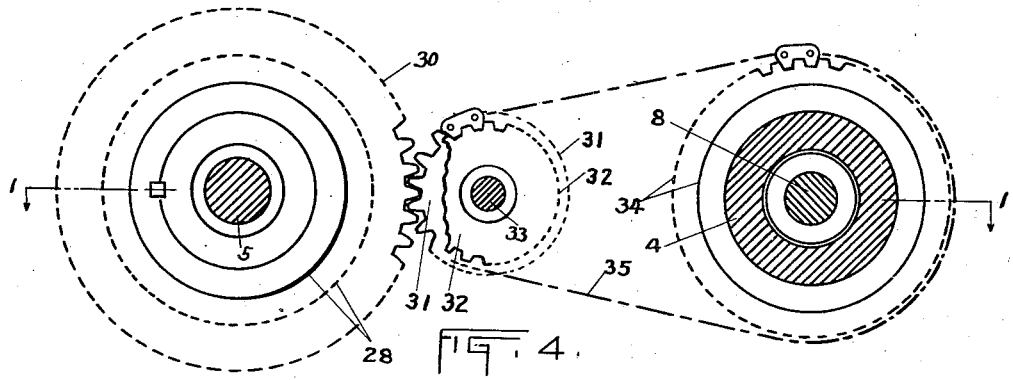
Fig. 4 is a side elevation of the reversing drive in one of the sets of control gearing and is taken on a line 4—4 of Figs. 1 and 2.

Fig. 11 is a detail view of one of the control shafts exterior to the main driving shafts as in Fig. 2. This view illustrates an exterior control shaft similar to the interior control shafts in Figs. 1 and 10 except the driven end. The view illustrates how this type may also be compounded. The view is symmetrical about the axial center of the main shaft.

Fig. 12 is a cross sectional view on a line 12—12 of Fig. 11.

Fig. 13 is a cross sectional view on a line 13—13 of Fig. 11.

Fig. 14 is a cross sectional view on a line 14—14 of Fig. 11.

I will first describe the compounded type shown in Fig. 1 in which the control shafts are concentric with the main driving and driven shafts.

In carrying out my invention as illustrated in Fig. 1 I show a rigid housing 1 in which the mechanism is assembled. Castings 2 are adapted for attachment to the housing 1 and support all of the mechanism in the following manner. Anti-friction bearings 3 revolvably support the two parallel tubular shafts 4 which are identical but are mounted in opposite parallel relation bringing the driving and driven ends on opposite sides of the machine. The castings 2 are also identical but are mounted in opposite relation on opposite sides of the machine.

A relatively small shaft 5 is preferably mounted intermediate of and parallel to the main tubular shafts 4 in bracket arms 6 extending inwardly from castings 2. Both ends of the intermediate shaft 5 are shown reduced in diameter and each outer end is further supported in cover castings 7 attached to the supporting castings 2.

Mounted concentrically in the two tubular shafts 4 and normally revolving therewith at identical speeds but capable of independent rotation therein, are the two control shafts 8. One end of each of the control shafts 8 projects outwardly from the end of its corresponding tubular shaft 4 and is reduced in diameter where it passes thru the threaded retaining bushing 9 in the ends of the tubular shafts 4. An integral thrust collar 10 is provided on each control shaft 8 adjacent to the threaded retaining bushing 9 and prevents endwise movement of same in one direction. On the projecting end of each control shaft 8 is a sprocket wheel 11 adjacent to the outer end of the threaded retaining bushing 9 and shown to be suitable for a driving chain 12 of the "silent" type. However, any type of driving chain may be used. One end of the hub of each sprocket wheel 11 is provided with square jaws 13 adapted to engage similar jaws on sliding clutch member 14. The sprocket wheel 11 is free to revolve on the control shaft 8 when not engaged by the clutch member 14 which is prevented from rotation on the control shaft 8 by the feather 15. It will be noted that the sliding clutch member 14 is square or hexagon in shape so that a wrench may be used to turn the corresponding control shaft 8 when the clutch member 14 is in the disengaged position. This enables the group of tapered discs on one of the tubular shafts 4 to be adjusted axially with respect to the group of tapered discs on the other tubular shaft. A nut 16 keeps the sliding clutch member 14 in engagement with the sprocket wheel 11 and also holds the sprocket wheel 11 against the end of the threaded bushing 9 which, in conjunction with the integral collar 10, positively retains the control shaft 8 in fixed longitudinal relation to its corresponding tubular shaft 4.

The construction of the control shafts 8 is shown clearly in Fig. 10. An integral section 17 of the control shaft 8 adjacent to the integral collar 10 is threaded and the remainder 8a is reduced in section and splined. A threaded sleeve 18 is slidable on the reduced section 8a but is prevented from revolving thereon by the splines. This sleeve 18 may be threaded all one hand if required but is shown threaded half one hand and half opposite hand. The end threaded section 19 is removably fixed in order that the sleeve 18 may be put in position, otherwise it could be integral with the control shaft. The outside diameter of all of the threaded sections is the same and allows them to turn freely in the tubular shafts 4.

Figure 7:
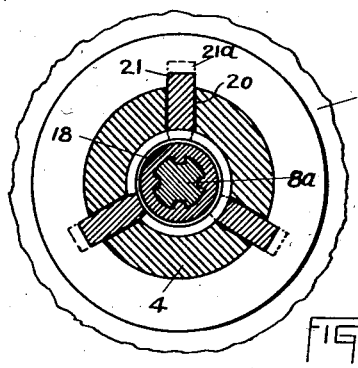
Fig. 7 is an enlarged cross sectional view of one of the main shafts with the concentric control shaft, sleeve and the threaded jaws in relation to the hub of one of the tapered discs. The section is taken on a line 7—7 of Fig. 1.
Figure 8:
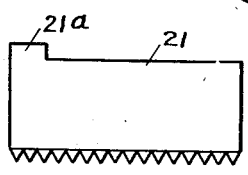
Fig. 8 is an enlarged side elevation of one of the threaded jaws.
Figure 9:
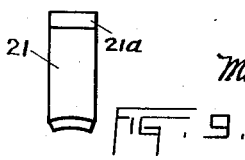
Fig. 9 is an enlarged end elevation of one of the threaded jaws.

The tubular shafts 4 are provided with openings 20 slotted longitudinally and registering with the threaded sections of the control shafts 8. In the transverse direction, as shown in Fig. 7, these slotted openings are in radial groups. In each slotted opening 20 is located a sliding jaw 21 which is threaded along its inner edge to engage a threaded section on the control shaft 8. These threaded jaws 21 are wider radially than the thickness of the wall of the tubular shafts 4 and are designed to act as keys for the tapered discs 22 and 22a. These tapered discs are slidable axially on the tubular shafts 4 but are prevented from revolving thereon by the key action of the threaded jaws 21. Jaws 21 are put in place in the hubs of the tapered discs in such a manner that the radial lugs 21a integral with the jaws resist the normal operating thrust of the tapered discs 22 and 22a. Obviously any rotational movement of a control shaft 8 with respect to its corresponding tubular shaft 4 will cause the threaded jaws 21 and the tapered discs 22 and 22a to move axially on the tubular shafts 4 in directions depending upon the direction of relative rotation of the control shaft 8 and also upon the "hand" of the threads on the threaded sections thereof. The control shafts 8 may be constructed with all threaded sections integral or fixed. However, in the compound type shown in Fig. 1, the threaded sleeve construction shown clearly in Fig. 10 is not only desirable but is a practical necessity in order to permit the several driving chains to equalize the driving stresses in the manner to be described later.

Figure 6:
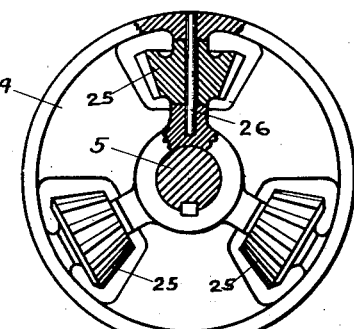
Fig. 6 is a side elevation, with partial section, of the central member of one of the differentials, keyed to the intermediate shaft.

The control mechanism is as follows. On the outer reduced ends of the intermediate shaft 5 are mounted identical differential gear sets each set composed of a central member 24 keyed on and carrying the usual bevel pinions 25 revolvable on radial shafts 26 as shown clearly in Fig. 6. Mounted on shaft 5 adjacent to the central member 24 on each side and meshing with bevel pinions 25 are the identical bevel gears 27 and 28 free to revolve on the shaft 5. On the hub of the bevel gear 27 of each set is secured a sprocket wheel 29 in line with sprocket wheel 11 and driven by the sprocket chain 12. On the hubs of the bevel gears 28 are secured spur gears 30 which mesh with spur pinions 31. These spur pinions 31 are shown integral with sprocket pinions 32 and obviously they must revolve together as a unit. The combined spur pinions 31 and sprocket pinions 32 are revolvably mounted on studs 33 projecting inwardly from the supporting castings 2. Each sprocket pinion 32 is in line with a driving sprocket wheel 34 on the end of the tubular shaft 4 and is driven therefrom by the sprocket chain 35. Thus it will be seen that the bevel gear 27 will be driven by the sprocket wheel 11 on control shaft 8 and bevel gear 28 will be driven by the spur gear 30, spur pinion 31 integral with sprocket pinion 32 and by sprocket wheel 34 on the tubular shaft 4. However, it will be clear that the inclusion of the spur gear 30 and spur pinion 31 in the driving train has the effect of reversing the direction of rotation of the bevel gear 28. Therefore bevel gears 27 and 28 will revolve in opposite directions and will also revolve at identical speeds since all driving elements are designed for this result when the tubular shafts 4 and their corresponding control shafts 8 are also revolving together in the same direction and at identical speeds no matter what these speeds may be. Since bevel gears 27 and 28 in each group revolve at identical speeds in opposite directions there will be no rotational movement of the central member 24 or of the intermediate shaft 5 on which it is mounted. Obviously, however, the converse is true. Turning the intermediate shaft 5 and the central members 24 thereon will cause one driving train in each group to move faster than the other train in the same group and this increase will be equal in both groups regardless of the speeds in each group.

Figure 5:
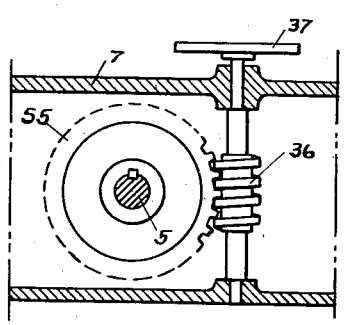
Fig. 5 is a side elevation of the gearing used to turn or hold the intermediate shaft at will. The view is taken on a line 5—5 of Figs. 1 and 2.

In Figs. 1, 2 and 5 I show a simple way of manually turning the intermediate shaft 5. A worm wheel 55 is keyed on one end of the intermediate shaft 5 and meshes with worm 36 mounted in cover casting 7. This worm 36 may be turned manually at will by means of hand wheel 37. Clearly an electric motor may be substituted for the hand wheel for remote control. The worm wheel 55 and worm 36 have a relatively small helical angle which normally locks the shaft 5 against rotation.

The foregoing description refers particularly to Fig. 1 which shows the compounded type with control shafts interior to the main shafts. In Fig. 2 I show the simple type using only 2 pairs of tapered discs and one driving chain. The essential difference, however, is the location of the control shafts 40 exterior to the main shafts 41 instead of concentric therewith. This design permits the use of solid splined driving and driven shafts 41 on which the tapered driving and driven discs are axially slidable. I show two control shafts 40 for each pair of tapered discs located diametrically opposite each other to give a balanced construction. These control shafts 40 pass thru the hubs of the tapered discs and are threaded right and left hand therein. The ends of the control shafts 41 are revolvably supported in special collars 46 keyed on the main shafts 41. The corresponding sections in each group are threaded opposite hand so as to cause discs on one main shaft 41 to move in the opposite direction to the corresponding ones on the other shaft.

The control mechanism shown in Fig. 2 is identical with that shown in Fig. 1 except the driving connection to the control shafts 40 which is as follows. On the projecting end of each control shaft 40 is secured a spur pinion 42 which is in mesh with spur gear 43, integral with sprocket wheel 44, driven by sprocket chain 35. The spur gears 43 and integral sprocket wheels 44 are free to revolve on the main shafts 41. Sprocket wheel 45 mounted on the outer ends of main shafts 41 drive sprocket chains 12.

The operation of my device is simple and positive. It is customary to drive one of the main shafts DR from a constant speed source of power. The other main shaft DN is driven from the shaft DR at varying rates of speed depending upon the relative pitch circles on which the driving chains contact the opposing tapered discs. In Fig. 1 the driven shaft DN is revolving at a much slower speed than the driving shaft DR while in Fig. 2 just the opposite is true. We have seen that as long as the intermediate shaft 5 remains stationary there can be no relative rotational movement of the control shafts about their axes with respect to their corresponding main shafts regardless of the speeds of the two main shafts. Turning the shaft 5 in the manner described will cause one of the driving trains in each control group to move at a different speed from the other in the same group. Since one driving train in each group is positively driven from one of the main shafts it is obvious that the driving trains connected to the control shafts must change in speed by the movement of the shaft 5 which, of course, revolves the control shafts about their axes with respect to their corresponding main shafts and, as we have seen, this relative rotational movement is exactly equal in all control shafts regardless of the relative speeds of the two main shafts DR and DN. This relative rotational movement, therefore, causes the tapered discs to move axially on their respective shafts by equal increments when the shaft 5 is turned at will in the manner described. The "hand" of the threads on the control shafts determines the relative direction of their axial movement. In the compounded type shown in Fig. 17 where two or more driving chains are used, the axially movable sleeves 18, which permit the independent axial movement of the two interior tapered discs 22a on each of the main shafts, allow the chains to adjust and equalize their driving stresses automatically. If, for example, one of the chains is contacting one pair of driving discs on a larger pitch circle than the other chain, it will travel faster than the other chain and therefore will assume all of the load. The increased stress will cause it to pull toward the center and thus crowd the two interior discs 22a, controlled by the sleeve 18 as a group, and force the other chain to gradually increase its operating pitch circle. This action continues until both chains have substantially equal operating pitch circles and therefore substantially equal driving stresses. The axial thrust of the outer discs on each of the main shafts, due to the crowding or spreading action of the driving chains, is taken care of very simply by their respective control shafts in tension and acting independently in this function. There are no frictional parts working under stress continuously as in the present designs of this type of transmission.

Having thus described my invention I claim as new and desire to secure by Letters Patent:

1. A variable speed transmission comprising in combination parallel revolvable main shafts, plural pairs of plain tapered discs axially adjustable thereon the adjacent inner discs of both co-operating pairs being independently movable axially as a group with respect to the outer disc of each co-operating pair, drive belts operable on corresponding co-operating pairs of said discs whereby one of said main shafts is driven from the other, control shafts exterior to and parallel with said main shafts and revolvable about their own axes with respect to said main shafts in supports carried by said main shafts said control shafts having fixed threaded sections spaced apart axially and registering with and engaging the hubs of the said outer tapered discs and an axially movable threaded sleeve section splined thereon intermediate of said fixed sections and registering with and engaging the hubs of the said adjacent inner tapered discs permitting them to move axially as a group with respect to the said outer discs by the equalizing action of said drive belts independent of the axial adjusting movement of all of said tapered discs, and positive means for revolving said control shafts with respect to said main shafts.

2. A variable speed transmission comprising in combination parallel revolvable main shafts, plural pairs of opposed plain tapered discs axially adjustable on said main shafts the adjacent inner tapered discs of both co-operating pairs being independently movable axially as a group with respect to the outer discs of each co-operating pair, drive belts operable on corresponding co-operating pairs of said discs whereby one of said main shafts is driven from the other, cotrol shafts revolvable about their own axes with respect to said main shafts in supports carried by said main shafts and in threaded engagement with said tapered discs each of said control shafts comprising a fixed threaded section toward one end registering in location with and engaging one of the said outer tapered discs, a removably fixed threaded section at the other end registering with and engaging the other of said outer tapered discs and a threaded sleeve section splined on said control shaft intermediate of said fixed threaded sections and movable axially thereon said sleeve section registering with and engaging the said adjacent inner tapered discs permitting the latter to move axially as a group with respect to said outer discs, by the equalizing action of said drive belts independent of the axial adjusting movement of all of said tapered discs, drive pinions mounted on said control shafts, positive driving means between each of said main shafts and the said drive pinions on the corresponding control shafts said positive driving means being exterior to said main shafts and each comprising a non-rotating pinion-carrying member secured on a separately mounted shaft, revolvable gear members oppositely disposed with respect to said pinion-carrying member and co-operating therewith, and dual drive connections, one of which is reversing, between respectively the said main shaft, the said drive pinions on the corresponding control shafts, and the corresponding revolvable gear members co-operating with said pinion-carrying member, a separately mounted shaft, normally stationary, on which all of sa'd pinion-carrying members and their co-operating revolvable gear members are mounted, and other geared means co-operating with said separately mounted shaft whereby the speed relation between said control shafts and said main shafts may be changed by equal increments at will, to effect an axial adjusting movement of all of said tapered discs.

3. A variable speed transmission comprising in combination parallel revolvable main shafts, plural pairs of opposed plain tapered discs axially adjustable on said main shafts the adjacent inner discs of both co-operating pairs being axially movable as a group with respect to the outer discs of each co-operating pair, drive belts operable on corresponding co-operating pairs of said discs whereby one of said main shafts is driven from the other, control shafts revolvable about their own axes with respect to the said main shafts in supports carried by said main shafts and in threaded engagement with said tapered discs each of said control shafts comprising fixed threaded sections spaced apart axially and registering with and engaging the said outer tapered discs and a threaded sleeve section splined on said control shaft intermediate of said fixed sections and axially movable thereon and registering with and engaging the said inner tapered discs, drive pinions mounted on the ends of said control shafts, main gear elements revolvable on said main shafts in engagement with the said drive pinions, drive members attached to said main gear elements, and positive driving means between each of said main shafts and the said corresponding drive member attached to a main gear element said positive driving means being exterior to the said main shaft and comprising a non-rotating pinion-carrying member mounted exterior to said main shaft, revolvable gear members oppositely disposed with respect to said pinion-carrying member and co-operating therewith, and dual drive connections, one of which is reversing, between respectively the said main shaft, the said drive member, and the said corresponding revolvable gear members co-operating with said pinion-carrying member, a separately mounted shaft in parallel relation to said main shafts, on which all of said pinion carrying members and co-operating revolvable gear members are mounted, and other co-operating gear members, one of which is secured on said separately mounted shaft, whereby the speed of said control shafts may be altered by equal increments with respect to said main shafts to effect an equal axial adjusting movement of all of said tapered discs at will.

4. In a variable speed transmission, a revolvable control shaft adapted for screwed engagement with a plurality of pairs of opposed tapered discs axially movable on a power shaft said control shaft having fixed threaded sections registering in location with the hubs of the outer tapered disc of each co-operating pair on said power shaft, a threaded sleeve section intermediate of said fixed threaded sections and axially movable but not revolvable on said control shaft said threaded sleeve section registering in location with the hubs of the adjacent inner tapered discs of both co-operating pairs on said power shaft, and a drive pinion on said control shaft by which it may be independently driven.

5. In a variable speed transmission, a revolvable control shaft adapted for rotative movement about a power shaft and revolvable with respect to said power shaft in supports carried thereby said control shaft also being in screwed engagement with a plurality of pairs of co-operating opposed tapered discs mounted on said power shaft and axially adjustable but not revolvable thereon, said control shaft comprising a fixed threaded section toward one end registering in location with the hub of one of the outer tapered discs of one co-operating pair on said power shaft, a removably fixed threaded section at the opposite end registering in location with the hub of the outer tapered disc of the other co-operating pair on said power shaft, a threaded sleeve section intermediate of said fixed threaded sections registering in location with the hubs of the adjacent inner tapered discs of both co-operating pairs said threaded sleeve being axially movable but not revolvable on said control shaft, and a drive member on said control shaft by which it may be driven relative to said power shaft.

6. In a variable speed transmission a plurality of co-operating pairs of opposed tapered discs axially adjustable on a power shaft the adjacent inner discs of both co-operating pairs being axially movable as a group with respect to the outer disc of each co-operating pair, in combination with a control shaft mounted to revolve about its own axis with respect to said power shaft in supports carried thereby and having screwed connections with the hubs of said co-operating opposed tapered discs, said control shaft having a fixed threaded section toward one end registering in location with and engaging the hub of the outer tapered discs of one co-operating pair on said power shaft, a removably fixed oppositely threaded section at the other end of said control shaft registering in location with and engaging the hub of the outer tapered disc of the other co-operating pair on said power shaft, and a threaded sleeve section axially movable but not revolvable on said control shaft intermediate of said fixed sections said sleeve sections having portions threaded opposite hand with respect to the threads on the adjacent fixed sections and registering in location with and engaging the hubs of said adjacent inner tapered discs of both co-operating pairs whereby the said inner discs may move axially as a group with respect to the said outer discs independent of the axial adjusting movement of all of said tapered discs, and a drive pinion on said control shaft by which it may be driven relative to said power shaft.

7. In a variable speed transmission, a power shaft, a plurality of opposed tapered discs axially adjustable thereon, a plurality of control shafts revolvable about their own axes with respect to said power shaft in supports carried thereby and in screwed engagement with said opposed tapered discs, and drive pinions mounted on said control shafts, in combination with a main gear element in mesh with the drive pinions mounted on said control shafts said main gear element being revolvably mounted on said power shaft, a drive member attached to said main gear element by which it is normally driven continuously at the same speed as the said power shaft, continuous positive driving means between said power shaft and the drive member attached to said main gear element said continuous positive driving means being exterior to said power shaft and comprising a non-rotating pinion-carrying member fixed on a separately mounted shaft, revolvable gear members co-operating with said pinion-carrying member on opposite sides thereof, positive belted driving connections between one of said revolvable gear members and said power shaft, positive belted and reversing gear connections between the other of said revolvable gear members and the drive member attached to said main gear element, a separately mounted shaft, normally stationary, and in parallel relation to said power shaft, on which the said pinion-carrying member and the co-operating revolvable gear members are mounted and other gear members one of which is secured on said separately mounted shaft, whereby the speed relation of said main gear element and the said control shafts driven thereby may be changed with respect to said power shaft at will.

8. In a variable speed transmission, a main gear element revolvably mounted in a power shaft, a drive member attached to said main gear element by which it is normally driven with respect to said power shaft and continuous positive driving means between said power shaft and said drive member on said main gear element, said continuous driving means being exterior to said power shaft and comprising a separately mounted pinion-carrying member, revolvable gear members co-operating with said pinion-carrying member on opposite sides thereof, dual drive connections, between respectively the said power shaft, the said drive member attached to said main gear element, and corresponding revolvable gear members co-operating with said pinion-carrying member, a separately mounted shaft on which said pinion-carrying member and the co-operating revolvable gear members are mounted, and other gear members co-operating with said separately mounted shaft to alter the normal speed of said main gear element with respect to the speed of said power shaft.

9. In a variable speed transmission, parallel main shafts, opposed plain tapered discs axially adjustable thereon, drive belts operable on said tapered discs, and control shafts exterior to said main shafts and revolvable about their own axes in supports carried by said main shafts and in screwed engagement with said tapered discs, and drive pinions fixed on said control shafts in combination with main gear elements meshing with the drive pinions on said control shafts said main gear elements being revolvably mounted on said main shafts, and drive members attached to said main gear elements.

MILTON T. WESTON.